United States Patent [19]

Yoshikawa et al.

[11] 3,997,642
[45] Dec. 14, 1976

[54] METHOD FOR TRANSFERRING AND HEATING A DEFORMED AND ONE-SIDED WALL-THICKNESS PARISON

[75] Inventors: Shinsuke Yoshikawa; Yuji Sawa; Takeshi Nakadai, all of Iwaki, Japan

[73] Assignees: Kureha Kagaku Kogyo Kabushiki Kaisha; Mitsui Toatsu Chemicals, Incorporated, both of Tokyo, Japan

[22] Filed: Dec. 27, 1974

[21] Appl. No.: 537,001

[30] Foreign Application Priority Data

Dec. 27, 1973 Japan ............................ 48-144515

[52] U.S. Cl. .................. 264/98; 425/DIG. 208; 432/11; 432/124
[51] Int. Cl.[2] ........................................ B29C 17/07
[58] Field of Search ............... 264/25, 89, 90, 92, 264/94, 96–99, 234, 345; 425/387 B, 326 B, DIG. 208, 216; 432/11, 124, 258; 219/388

[56] References Cited

UNITED STATES PATENTS

| | | | |
|---|---|---|---|
| 2,792,593 | 5/1957 | Hardgrove, Jr. | 425/DIG. 208 |
| 3,477,700 | 11/1969 | Kinslow, Jr. | 432/124 X |
| 3,680,763 | 8/1972 | Ludder | 215/1 C X |
| 3,740,868 | 6/1973 | Moore et al. | 432/124 |
| 3,850,573 | 11/1974 | Yoshikawa et al. | 432/124 |

Primary Examiner—Jan H. Silbaugh
Attorney, Agent, or Firm—Sughrue, Rothwell, Mion, Zinn & Macpeak

[57] ABSTRACT

A blow molding method for transferring and heating deformed and one-sided wall-thickness parisons in which each heated parison is expanded in conformity with the mold after being stretched or just after being heated, with the use of a conveying device provided with a number of upright pins inserted into the parisons and adapted for continuous travel within a furnace while being rotated, the inner section of each parison being irregular and/or having a varying circumferential wall-thickness the upright pins having a section, which fits an inner section of the parison, formed at the lower part thereof and including a planar portion placed into sliding contact with a guide rail provided at an outlet of the furnace in order to relatively position the parison. The improvement comprising transferring across the furnace each upright pin after the parison has been insertably mounted onto the upright pin while the rotation of the upright pin is stopped for a time, lightly holding the top of the parison by an inverted funnel type guide funnel and during the light holding, rotating a positioning piece fitted with the upper inner section of the parison so that the positioning piece moves downward to properly fit the parison, subsequently upwardly retracting the guide funnel and positioning piece to cause each parison to rotate and again to be reversely transferred across and to be heated within the heating furnace, and when each parison is moved out of the furnace, again stopping only the rotation of each upright pin so that a guide rail fixedly mounted at an outlet of the furnace at a predetermined angle may be brought into sliding contact with the planar portion formed at the lower part of the upright pin, whereby the relative positional relationship between each parison and the parison stretching device or the relative positional relationship between each parison with the mold coincide.

1 Claim, 13 Drawing Figures

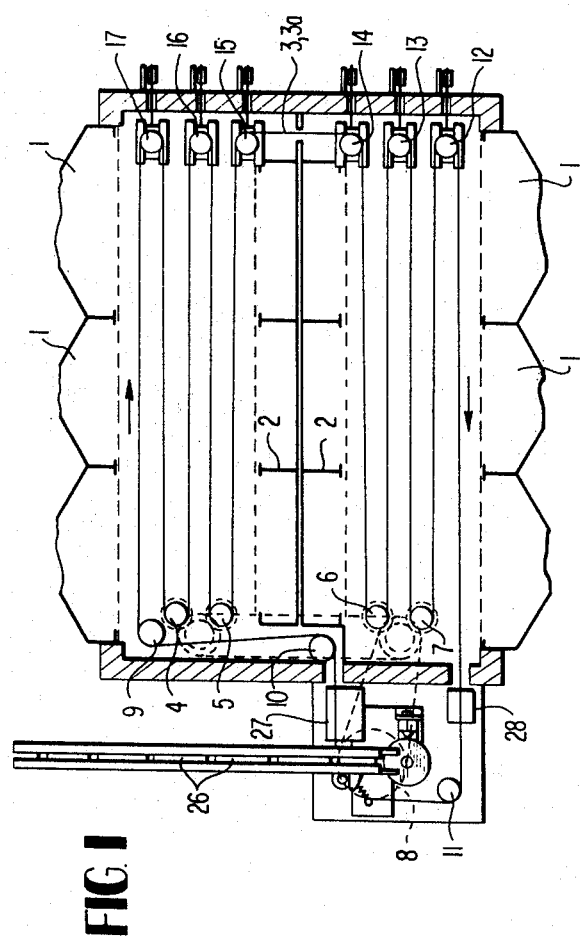
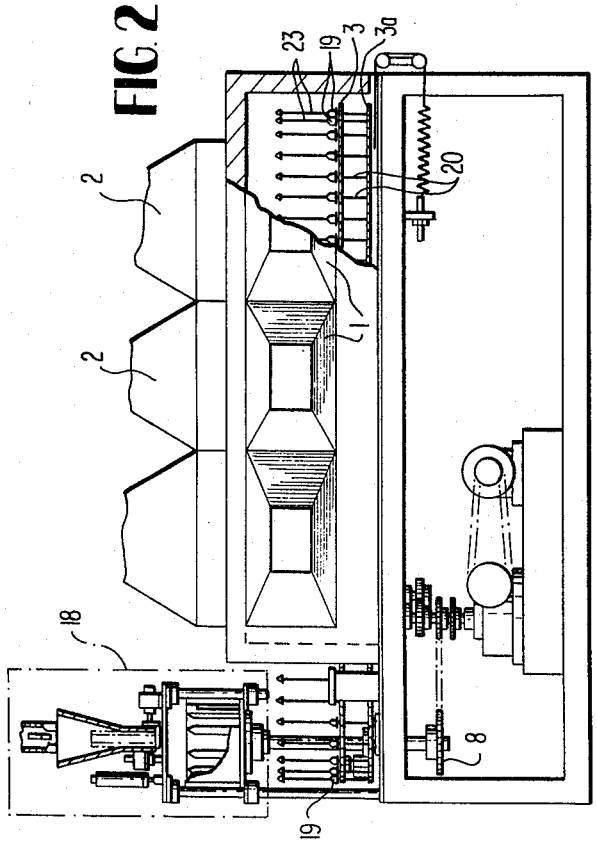
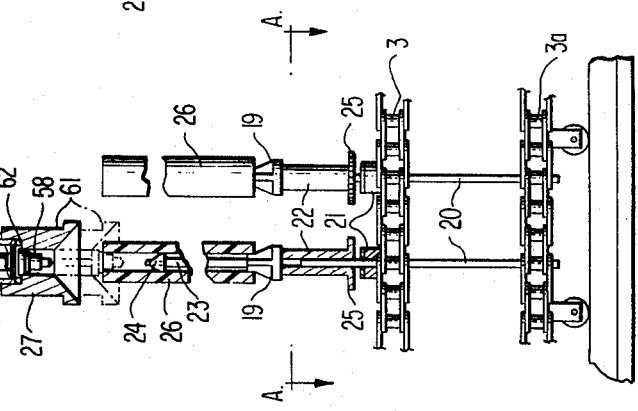
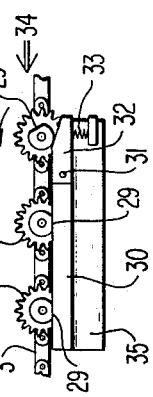
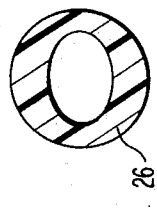

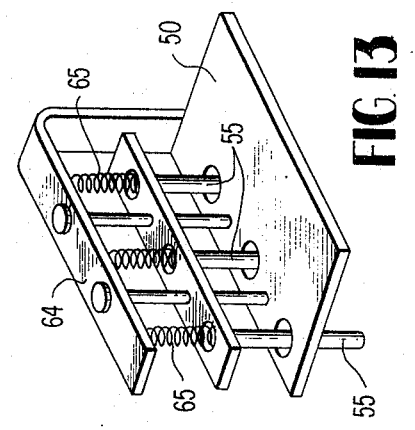
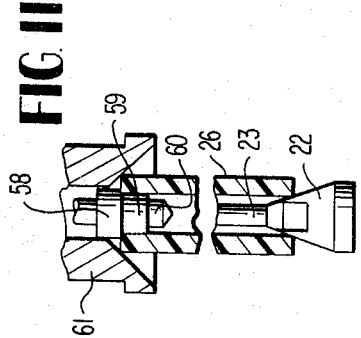
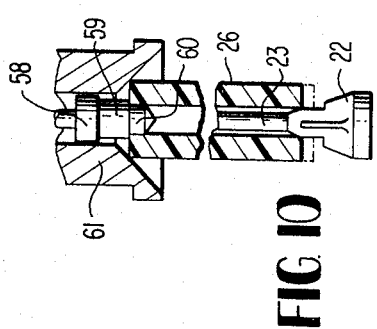
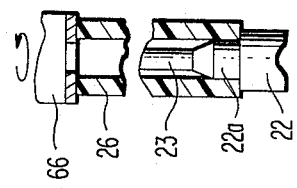
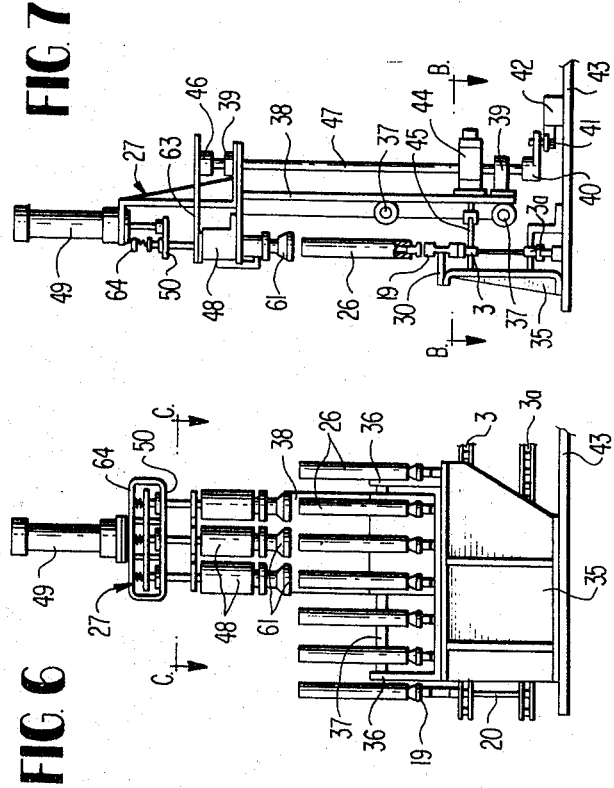
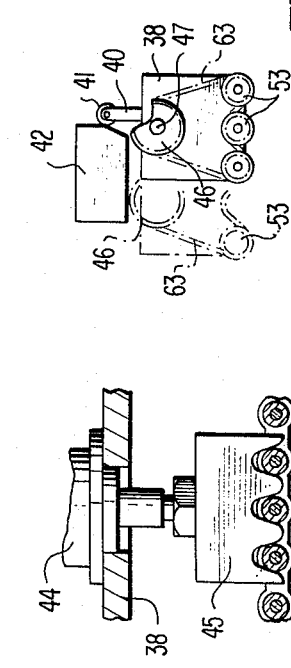

METHOD FOR TRANSFERRING AND HEATING A DEFORMED AND ONE-SIDED WALL-THICKNESS PARISON

BACKGROUND OF THE INVENTION

1. Field of the Invention

This invention relates to a method for transferring and heating a non-regular and/or variable wall-thickness parison. More specifically the invention relates to a method which comprises heating a plastic tubular parison cut to a predetermined length in which the parison has an inner or outer section of non-regular or variable wall-thickness to a predetermined molding temperature within a heating furnace and feeding the parison to a blow molding stage in conformity with a mold flat or angular in section.

2. Description of the Prior Art

In the blow molding of containers of the like with plastics heretofore used, a number of method have been proposed. One of these methods is called a hot parison method wherein an extruding machine or an injection molding machine is used to form resins into a tubular or bubble configuration. The resin is then subjected to blow molding while the resin is in a semi-molten state. Another of these methods is called a cold parison method wherein a material once formed into a tubular or bubble configuration is then once cooled and re-heated to a semi-molten state or up to a molding temperature, after which it is subjected to blow molding.

In either of these methods, problems remain to eliminate the irregularities in the wall-thickness of the molded articles. In forming round containers, a substantially uniform wall-thickness at the periphery of the container may be obtained somehow, whereas in forming flat containers which have a sectional periphery whose ratio of the long axis thereof to the short axis thereof is comparatively large, and if a parison round in section and having a uniform wall-thickness is used, the difference of wall-thickness between the long axis portion and the short axis portion becomes great and the wall-thickness in the direction of the long axis portion becomes thin, thereby decreasing the rigidity, strength or the like of the containers. When an attempt is made to compensate for such disadvantages by increasing the wall-thickness, the thickness in the direction of the short axis portion becomes excessively large, resulting in problems occurring such as decreased transparency and an increase in the amount of resin required, leading to higher cost.

In an effort to overcome those disadvantages as noted above, an extrusion forming stage for producing parisons has been proposed, in which the parison is prepared so as to have a thick portion in the direction of the long axis portion or an elliptical parison fitted for a metal mold is prepared prior to the step of blow molding, whereby the wall-thickness of the molded articles can be made uniform. In this case, according to the former method, that is, the hot parison method, the parison extruded and formed is immediately held by the metal mold for blow molding so that the molding can be accomplished by readily adjusting the one-sided thickness of the parison or the elliptical portion to the flattened portion of the metal mold. In the case of the latter method, that is, the cold parison method, however, this method usually involves the step of first cooling the extruded and formed parison and cutting it in a predetermined length and then re-heating the same, and as a result, it is difficult to adjust the deformed and one-sided wall-thickness direction of the parison to the deformation direction of the metal mold.

SUMMARY OF THE INVENTION

A blow molding method for transferring and heating a deformed and one-sided wall-thickness parison "in which the heated parison is expanded in conformity with the mold after being stretched or just after being heated," with the use of a conveying device provided with a number of upright pins into which parison are insertably mounted and adapted for a continuous travel within a furnace which is being rotated about itself, the inner section of the parison being irregular and/or having a varying circumferential wall-thickness the upright pins having a section, which fits an inner wall of the parison, formed at the lower part thereof and including a planar portion placed into sliding contact with a guide rail provided at an outlet of the furnace in order to relatively position the parison. The improvement comprises transferring each upright pin after the parison has been inserted onto the upright pin while the rotation of the upright pin is stopped for a time, lightly holding the top of each parison by an inverted funnel type guide funnel and during the light holding rotating a positioning piece fitted within the upper inner wall of the parison so that the positioning piece moves downward to properly fit the parison, subsequently upwardly retracting the guide funnel and positioning piece to cause each parison to rotate, again transfer and heat the parison within the heating furnace, and when the parison is moved out of the furnace, again stopping only the rotation of the upright pin so that a guide rail fixedly mounted at an outlet of the furnace at a predetermined angle may be brought into sliding contact with the planar portion formed at the lower part of the upright pin, whereby the relative positional relationship between the parison and the parison stretching device or the relative positional relationship between the parison with the mold coincide.

BRIEF DESCRIPTION OF THE DRAWINGS

FIG. 1 is a plan view of a hot air heating furnace;
FIG. 2 is a front view of the furnace in FIG. 1;
FIG. 3 is a side view of a parison receiving pin and a positioning device;
FIG. 4 is a sectional view of a deformed and one-sided parison;
FIG. 5 is a perspective view taken on A—A of FIG. 3;
FIG. 6 is a front view of the positioning device;
FIG. 7 is a side view of the positioning device in FIG. 6;
FIG. 8 is a perspective view taken on B—B of FIG. 7;
FIG. 9 is a perspective view taken on C—C of FIG. 6;
FIGS. 10 and 11 are longitudinal sectional views of a positioning device portion showing the order to the parison positioning;
FIG. 12 is a longitudinal sectional view showing another mode of the parison positioning device; and
FIG. 13 is a perspective view showing the relationship between receptacle plate and spline shaft of FIG. 6.

DETAILED DESCRIPTION OF THE INVENTION

The present invention is described above relates to a method for transferring and heating a parison by controlling the directivity as in the cold parison method.

Among various furnaces used to re-heat parisons currently proposed, one method is frequently employed, wherein a parison receiving pin is vertically erected and the parison is telescoped onto the pin to heat the parison during circulation within the heating furnace. This invention further relates to a method for treatment of the deformed and one-sided wall-thickness parison as previously discussed with the use of a heating furnace of the type as just described.

Various devices are disclosed in the prior art in which chains are provided, with the chain travelling in a zig-zag fashion within the furnace, and tubular parison supporting pins are positioned on the chains. The parisons inserted on and carried by the pins are re-heated. However, in the method for transferring and heating a deformed and one-sided wall-thickness parison as disclosed herein, the method can be carried out by incorporating a device for supporting a deformed and one-sided wall-thickness parison having a non-circular section in a predetermined position into the above described re-heating apparatus.

In order to insertably mounted a deformed parison whose inner wall is in the form of, for example, an ellipse or is angular onto the parison receiving pin with the section of the parison directed in a given direction, two methods are described. One method as illustrated in FIG. 3 to 9 will be first described briefly (and later described in detail). The parison receiving pin comprises a planar portion directed in a given direction when coming into sliding contact with control plates mounted in position at the inlet and outlet of the furnace and further comprises a parison receiving bed and a support pin. The parison receiving bed is tapered so as to center parisons received thereon and is mounted in a given direction with respect to the chain, a section of the bed conforms in shape with the inside wall of parison or is shaped so that an elliptical parison can be easily positioned thereon. Accordingly, the arrangement can be such that when the position of the parison is adjusted, the relative relation between the parison receiving pin and the parison is not easily changed due to vibrations or the like. A control plate secured at a predetermined angle may come into sliding contact with a planar portion formed in the parison receiving bed. A parison positioning device which can be moved synchronously with the pin is fixedly positioned wherein rotation of each the parison receiving pin is controlled. Several positioning means and guide funnels corresponding to the parison receiving pins are provided at the upper part of this positioning device. The positioning means has a periphery whose contour is approximately the same as that of the inner section of the parison and whose dimension is such that it may protrude and engage the inner wall of the parison at an angle. The positioning means rotates about 180 degrees while transferring synchronously with the parison receiving pin until the positioning means stops at a predetermined position. Prior to entering the fixed position wherein rotation of the parison receiving pin is controlled, parisons are insertably mounted piece by piece onto the parison receiving pins at a random angle at a parison supply station, and when the parison is moved to the positioning point, the guide funnel is first moved down through a spring from the top to center the parison and simultaneously hold the parison lightly. Then the positioning means is moved down while being rotated and is urged against the end of the parison due to the action of the spring. After this when the positioning means is adjusted to the contour of the inner wall of the parison, the positioning means is further moved down into the parison causing the parison to rotate with the positioning means. In the position wherein the rotation of the positioning means is stopped at a predetermined position, the parison receiving bed and the elliptical direction of the inner wall of the parison may assume their predetermined positions. Then, the positioning means moves upwardly and simultaneously the guide funnel also moves upwardly. As a result, the entire positioning means is moved and returned to carry out the repositioning again of succeeding parisons. In this synchronous movement with each parison, an air cylinder encased in the positioning means for the parison receives an electrical signal and a pawl is projected. This pawl is then engaged with the chain by which each parison receiving pin is driven whereby the entire positioning means may be moved by the chain. Upon completion of a series of operations with respect to the positioning as described above, the air cylinder again receives an electrical signal to disengage the pawl and return to the pawl to its initial position by action of a spring.

Each parison engaged with the parison receiving pin in a manner as described above is heated within the furnace, and a control plate is provided outside the furnace the control plate is secured at a predetermined angle and is brought into sliding contact with the planar portion formed in the parison receiving bed to thereby put the parison receiving pins in order in a predetermined direction. As a consequence, the parisons are also oriented in the same direction as that of the pins. In such a state, each parison is removed from the pin into the metal mold so that the relative relation thereof with the metal mold is always be maintained constant.

Separately from the above-described positioning method, it is to be understood that as shown in FIG. 12 the parison receiving bed may be modified in shape so that a straight line portion conforming in shape to the inner section of the parison is provided in such a way that when the parison receiving bed is adjusted in direction to the inner section of the parison, the parison may fail into engagement therewith. A light lifting force from the top and a turning from the side acts on the parison.

A feature of the former method is that the parison receiving bed may be used in common even if the dimension of the inner section and shape of the parison is slightly changed, but the accuracy of positioning the rotating direction suffers somewaht. In contrast to the former method, the latter method is limited with respect to the dimension of the inner section and the shape of the parison, but the accuracy of positioning the rotating direction may be improved. Therefore both the method can be advantageously used as necessary.

A preferred embodiment of the present invention will now be described in detail with reference to the accompanying drawings.

Referring now to FIGS. 1 and 2, these figures show a hot air heating furnace adapted to feed hot air through a duct 1 and to evacuate the air through a duct 2. Within the heating furnace upper and lower rows of parallel endless chains 3, 3a are continuously moved through drive sprockets 4 to 8 and guide sprockets 9 to 17 turning up and down in a zig-zag fashion in association with the operation of a parison charging device 18. In the two rows of chains 3, 3a are vertically erected lengthened chain pins 20 spaced several pitches as shown in FIG. 3. The extremity of each of the chain pins 20 receives thereon a parison receiving pin 19. The pin 19 has a parison receiving bed 22 formed of a cylindrical shape at the lower part thereof, which is fitted in the chain pin 20. A sprocket 25 is coupled to the underside of the bed 22 and a stop collar 21 is provided thereunder to prevent the bed from rising up. A guide face 29 with one round portion of which is chamfered is in the center of the parison receiving bed 22, and a support pin 23 is attached to the upper part of the guide face and a steady rest collar 24 is attached to the extremity of the pin 23. When a parison 26 is pushed from the top onto the support pin 23, the parison 26 is then held vertically as shown in FIG. 3. When parisons 26 are inserted in order into the above-described parison receiving pins 19 through the parison charging device 18, the parison receiving pins 19 carried by the chains 3, 3a, spaced at a constant pitch, are continuously conveyed into the furnace. Within the furnace, a sprocket 25 is engaged with a chain (not shown) fixed in a position wherein the sprocket is engaged and the parison receiving pin 19 advances while rotating and the parison 26 heated to a suitable temperature when discharged from the furnace is disengaged from the receiving pin 19 into the metal mold. The parison receiving pin 19 with the parison disengaged therefrom further moves under the parison charging device 18 to receive therein another parison.

In accordance with the method of the invention, a parison positioning device 27 and a fixing device 28 are incorporated in the heating furnace as previously described so that the parison 26 whose section is in a deformed and (or) one-sided form as shown in FIG. 4 may be inserted into a metal mold in a predetermined direction.

First, the parison 26 with its deformed mouth directed at random is slid onto the parison receiving pin 19 from the parison charging device 18. A guide face 29 is formed in a portion of the parison receiving bed 22 with one round portion of the guide face being chamfered as shown in FIG. 5. In a position wherein rotation of the parison receiving pin 19 is controlled, are provided a control plate 30 mounted on the bed 35 and a buffer guide plate 32 biased by means of a spring 33 movable about a point as indicated at 31 is in such a way that when the chains 3, 3a move in the direction as indicated by the arrow 34, the chamfered portion of the parison receiving bed 22 strikes the buffer guide plate 32 causing rotation. When the guide face 29 is brought into a parallel relationship with the buffer guide plate 32 or control plate 30, rotation of the buffer guide plate is stopped but it is kept moving. A parison positioning device 27 is located at the control plate 30 as shown in FIGS. 6 and 7. This device includes two guide bars 37 secured to a bracket 36 mounted on a mount 43, and the guide bars 37 serve as a guide to move a frame 38 laterally. An air cylinder 44 is mounted on the frame 38 as shown in FIG. 8. The extreme end of the air cylinder is provided with a pawl 45 to engage the chain 3 so that the frame 38 may be moved synchronously with chains 3, 3a. That is, a signal from a timing cam (not shown) causes the air cylinder 44 to operate, and the chain 3 is engaged with the pawl 45 to move the entire frame 38 with the chain 3. A shaft 47 carried by bearings 39 in a longitudinal direction is mounted on the frame 38, a lever 40 is fixed at the lower end of the shaft 47 and a roller 41 is mounted at the extremity of the lever 40. A cam 42 on the mount 43 is mounted in a position corresponding to the roller 41 so that when the frame 38 is laterally moved the shaft 47 rotates as the roller 41 moves along the cam 42 to cause the sprocket 46 mounted at the upper end of the shaft to rotate. On the other hand, several sets of positioning devices 48 are mounted at the upper part of the frame 38, and these positioning devices 48 cooperate in a proper timing relationship with the parison receiving pins 19 to cause the pawl 45 to engage the chain 3 for movement of each other.

The positioning device 48 is constructed as shown in FIG. 3. Namely, a case 51 mounted on the frame 38 receives therein an intermediate shaft 54 through bearings 52, and a sprocket 53 secured to the intermediate shaft is rotated by a chain 63 connected to the sprocket 46. In the center of the intermediate shaft 54 is received a spline shaft 55, which is movable up and down with respect to the intermediate shaft 54 but is coupled thereto in the rotating direction. A slide bearing 56 is located under the intermediate shaft 54, and guide funnels 61 are outwardly carried for up and down movement, the range of which is controlled by a stopper 67. A ring 62 is retained intermediately of the guide funnel 61, and as may be seen most clearly in FIGS. 10 and 11, the extreme end 60 is round in shape with a diameter corresponding to the smallest diameter of the parison 26 while differently shaped elliptical portion 59 is in registration with the inside wall of the parison 26. When a positioning piece 58 constructed as described above is over the parison receiving pin 19 to cause the pawl 45 to engage the chain 3 for initiation of lateral movement, an air cylinder 49 is actuated by a signal from a timing cam (not shown), which is synchronized with the chain 3, to move a receptacle plate 50 downwardly and simultaneously to move the spline shaft 55 downwardly whereby the guide funnel 61 may move down onto parison 26 due to the weight thereof to center the parison 26. At almost the same time, the spline shaft 55 is urged down through a spring 65 by means of a pusher plate 64 mounted on the receptacle plate 50, whereby the positioning piece 58 assumes a position as shown in FIG. 10. That is to say, the inside wall of the parison 26 is not registered with the elliptical shaped portion 59, but the extreme tip end 60 enters the parison 26.

In this state, when the chains 3 and 3a and frame 38 move laterally, the shaft 47 is rotated by the cam 42 and the intermediate shaft 54 is rotated through a chain 63 so that the spline shaft 55 imparting a downward force may also rotate. At this time, the parison 26 is pressed by the guide funnel 61 so that the parison 24 is not rotated. Then, when the inside wall of the parison 26 is in registery with the elliptical shaped portion 59 of the positioning piece 58, the spline shaft 55 is moved downwardly by action of the spring 65 and the portion 59 enters the parison as shown in FIG. 11. In this state, each parison 26 may also rotate with the spline shaft 55, and each parison 26 is stopped with the spline shaft 55 in a predetermined angular position. In this case, the parison receiving bed 22 is assured to fit with the lower end of the parison 26 as shown in FIG. 11 to thereby avoid occurrence of relative movement in the rotating direction due to vibration to some extent.

Next, when the air cylinder 49 is actuated in a predetermined position to move the receptacle plate 50 upwardly, the spline shaft 55 is first disengaged and the guide funnel 61 is then moved upwardly. Then, when the air cylinder 44 is actuated by a signal from the timing cam (not shown) to retract the pawl 45, the frame 38 is returned to its original position by means of a spring (not shown). Upon generation of the next signal, the same operation as that of the above is repeated.

An alternative positioning method may also be employed wherein as illustrated in FIG. 12, the end 22a of the parison receiving bed 22 is preformed into a short bar, in section, in registration with an elliptical contour of the inside wall of the parison 26 shown in FIG. 4, and the parison 26 received on the parison receiving pin 19 is pressed from the top so as to rotate a rotary plate 66, whereby when the lengthwise axial direction of the parison 26 is in registeration with the lengthwise axial direction of the end 22a, the parison 26 is dropped and engaged to effect positioning.

When the parison 26 is inserted in a direction determined with respect to the guide face 29 of the parison receiving pin 19 in a manner as previously described, the parison 26 will rotate and move into the funace along with the receiving pin 19 rotated and moved by engagement with the fixed chain and stopping rotation of the receiving pin 19 by the provision of the fixing device 28 as shown in FIG. 1 located in a position wherein the heated parison 26 is moved out of the furnace. The fixing device 28 has the same construction as that of the fixing device shown in FIG. 5. In a position wherein the direction of the parison receiving pin 19 is determined, the heated parison 26 is removed and inserted in the metal mold. From this, it will be apparent that the direction of the metal mold and the direction of the parison 26 may always be made constant.

As will be understood from the foregoing preferred embodiments, the method of the present invention provides an improvement in which the position of the inside wall of the deformed parison is controlled and arranged in order that the parison after being heated may be inserted in the metal mold in a desired predetermined direction thereby providing a smooth connection with the subsequent molding step. Thus, the method in accordance with the present invention may be extremely effectively utilized industrially.

While the invention has been described in detail and with reference to specific embodiments thereof, it will be apparent to one skilled in the art that various changes and modifications can be made therein without departing from the spirit and scope thereof.

What is claimed is:

1. In a blow molding method for transferring and heating deformed and one-sided wall-thickness parisons in which each heated parison is expanded in conformity with a mold after being stretched in a parison stretching device or just after being heated with the use of a conveying device provided with a number of upright pins on which parisons are respectively insertably mounted and adapted for continuous travel within a furnace while being rotated themselves, the inner wall of each parison being irregular, each upright pin having a section, which fits the inner wall of a parison at the lower part thereof and including a planar portion placed into sliding contact with a guide rail provided at an outlet of the furnace in order to relatively position each parison, the improvement comprising: the steps of transferring each upright pin after a parison has been insertably mounted thereon across the furnace while the rotation of the upright pin is stopped for a time by lightly holding the top of each parison by an inverted funnel type guide funnel, during the light holding, rotating a positioning piece fitted within the upper inner wall of the parison so that the positioning piece moves downward to properly fit the piece within the parison and then positions the parison on the upright pin, subsequently upwardly retracting the guide funnel and positioning piece, causing each parison to rotate again prior to being again reversely transferred across and heated within the heating furnace, and when each parison is moved out of the furnace, again stopping only the rotation of each upright pin so that a guide rail fixedly mounted at an outlet of the furnace at a predetermined angle may be brought into sliding contact with the planar portion formed at the lower part of each upright pin, whereby the relative positional relationship between each parison and the parison stretching device or the relative positional relationship between each parison and the mold coincides.

* * * * *